March 14, 1933.  J. A. RODGERS  1,901,474
MOTOR SUPPORT
Filed May 31, 1932
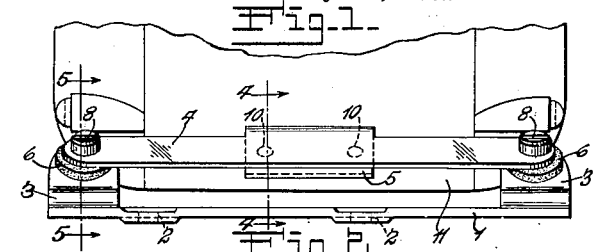
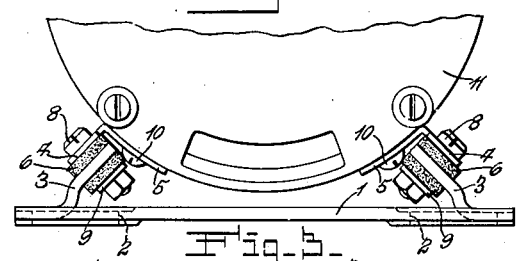
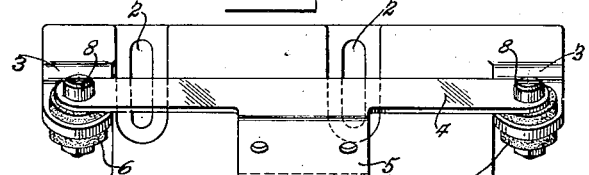
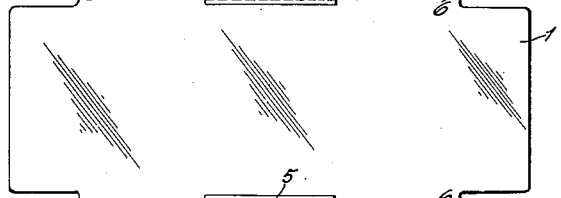
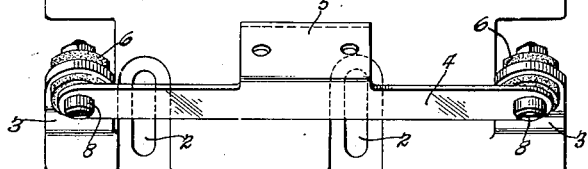
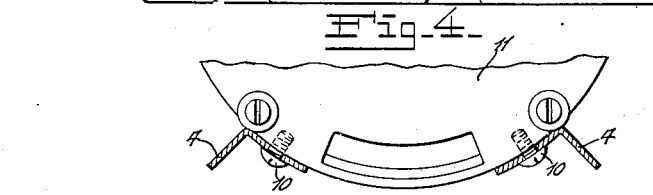
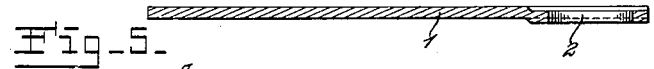
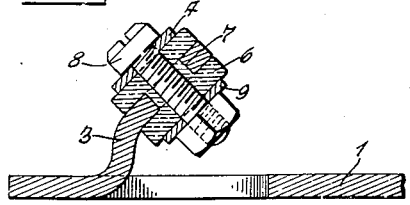
Inventor
James A. Rodgers
by Rippey & Kingsland
His Attorneys Patented Mar. 14, 1933

1,901,474

UNITED STATES PATENT OFFICE

JAMES A. RODGERS, OF ST. LOUIS, MISSOURI, ASSIGNOR TO THE EMERSON ELECTRIC MFG. CO., OF ST. LOUIS, MISSOURI, A CORPORATION OF MISSOURI

MOTOR SUPPORT

Application filed May 31, 1932. Serial No. 614,391.

This invention relates to a support for an electric motor.

An object of this invention is to provide a support for an electric motor which will reduce motor noise and vibration to a minimum and which will be simple in construction, economical to manufacture and durable in service.

Specific objects of the invention will be apparent from the following detail description taken in connection with the accompanying drawing, in which—

Fig. 1 is a side elevation of the support with a motor mounted thereon.

Fig. 2 is an end elevation.

Fig. 3 is a plan view of the motor support.

Fig. 4 is a vertical section on line 4—4, Fig. 1 with the motor in elevation.

Fig. 5 is a detail vertical section on line 5—5, Fig. 1.

A base plate 1, preferably stamped from sheet steel stock, has slots 2 by which it may be secured to a machine or other support. The base plate 1 has upstanding lugs 3, preferably resilient and preferably punched from the plane of the plate 1.

A pair of parallel resilient bars 4, preferably stamped from sheet steel stock of lighter gauge than the base plate, have ears 5, which may be formed integral therewith and, as shown in the specific embodiment, may be arranged substantially perpendicular to the plane of the bars, respectively, as best shown in Fig. 4.

The ends of the bars 4 are secured, respectively, to the lugs 3 in the manner best shown in Fig. 5. A rubber spool washer 6 is positioned in a hole 7, punched near the top of the lugs 3, and the bar 4 is placed on top of the washer 6, with a bolt 8 passing through a hole punched in the end of the bar 4, the washer 6 and the hole 7. A rigid washer 9 is positioned against the rubber spool 6 opposite the bar 4.

The arrangement is such that the ears 5 with the bars 4 form a saddle for the motor and the ears may be attached by machine screws 10 passing through the ears 5 and into the frame 11 of the motor.

It will be noted that the bars 4 are resilient, that the lugs 3 are resilient, and that the attachment between the bars 4 and the lugs 3 is shock absorbent. Since the base member 1, as well as the lugs 3, is resilient, there will be a tendency to vibration and, of course, the resiliency of the bars 4 permits vibration in those members. Vibration in any machine tends to occur at a definite frequency. The vibration of the lugs 3 and the base 1, and particularly of the lugs 3, will be on one frequency, whereas the vibration of the bars 4 will be on an entirely different frequency. The shock absorption connection between the lugs and the bars has a tendency to dampen these vibrations and also permits the vibration of the base 1, including the lugs 3, to counter the vibration of the bars 4. Thus, while free vibration is permitted, especially in the bars 4, that vibration will not be transmitted to the base but will tend to dampen any vibration that may be induced in the base.

There are two types of vibrations originating in an electric motor which are the causes of objectionable noises: First and most important, a vibration torsional in nature resulting from a lack of uniformity in the single phase field and the torque resulting therefrom; and second, a vibration due to the parts being out of dynamic balance.

In order to accomplish the absorption of the first type of vibration without the sacrifice of stability or rigidity of motor shaft position in relation to the base assembly, the two resilient bars 4 are placed in planes which intersect each other approximately at the shaft center and which are approximately at right angles in respect to one another. This construction provides against shaft movement due to load out of its proper alinement. Further, it provides against excessive longitudinal movement of the motor shaft but, at the same time allows freedom of motion torsionally about the shaft center.

In order to obtain the elimination of the second mentioned difficulty, rubber bushings and generally resilient base lugs are provided.

It will thus be seen that the invention accomplishes its objects, and that it is simple in construction, economical to manufacture and durable in service.

Various changes may be made in the details of construction, within the scope of the appended claims, without departing from the spirit of this invention.

I claim:

1. A motor support comprising a pair of resilient bars, means intermediate the ends of the bars for attaching them to the frame of the motor symmetrically with reference to a central vertical plane passing axially through the motor and parallel to such plane, a base having upstanding lugs, clamping means for securing the bars to the lugs, and shock absorbing elements interposed between the bars and the lugs.

2. A motor support comprising a pair of resilient bars, ears integral with the bars located between the ends thereof, means for securing the motor frame to the ears in such a manner that the bars are positioned symmetrically with reference to a central vertical plane passing axially through the motor and parallel to such a plane, a base having upstanding lugs, clamping means for securing the bars to the lugs, and shock absorbing elements interposed between the bars and the lugs.

3. A motor support comprising a pair of resilient bars stamped from resilient sheet metal with ears integral with the bars located between the ends thereof, means for securing the ears to the motor frame in such a manner that the bars are positioned symmetrically with reference to a central vertical plane passing axially through the motor and parallel to such plane, a base having upstanding lugs, clamping means for securing the bars to the lugs, and shock absorbing elements interposed between the bars and the lugs.

4. A motor support comprising a pair of resilient bars, means intermediate the ends of the bars for attaching them to the frame of the motor symmetrically with reference to a central vertical plane passing axially through the motor and parallel to such plane, a base stamped from resilient sheet metal including upstanding lugs struck from the base, clamping means for securing the bars to the lugs, and shock absorbing elements interposed between the bars and the lugs.

5. A motor support comprising a pair of resilient bars, means intermediate the ends of the bars for attaching them to the frame of the motor symmetrically with reference to a central vertical plane passing axially through the motor and parallel to such plane, a base having resilient upstanding lugs, clamping means for securing the bars to the lugs, and shock absorbing elements interposed between the bars and the lugs.

6. A motor support comprising a pair of resilient bars, means intermediate the ends of the bars for attaching them to the frame of the motor symmetrically with reference to a central vertical plane passing axially through the motor and parallel to such plane, a base having upstanding lugs, clamping means for securing the ends of the bars to the lugs respectively, and rubber spool washers interposed between the bars and the lugs.

7. A motor support comprising a pair of bars struck from resilient sheet metal with ears integral therewith intermediate the ends of the bars for attaching them to the frame of the motor, a base struck from resilient sheet metal of heavier gauge than the bars and having upstanding lugs integral therewith, clamping means for securing the ends of the bars to the lugs respectively, and shock absorbing elements interposed between the bars and the lugs.

8. A motor support comprising a pair of resilient bars having ears integral therewith and forming a saddle for the motor, a base having upstanding lugs, clamping means for securing the ends of the bars to the lugs respectively, and shock absorbing elements interposed between the bars and the lugs.

9. A motor support comprising a pair of flat resilient bars lying in planes intersecting each other substantially in the shaft center of the motor, means intermediate the ends of the bars for attaching them to the frame of the motor, a base, and means for attaching the ends of the bars to the base.

10. A motor support comprising a pair of flat resilient bars lying in planes substantially normal to each other and intersecting each other substantially in the shaft center of the motor, means intermediate the ends of the bars for attaching them to the frame of the motor, a base and means for attaching the ends of the bars to the base.

11. A motor support comprising a pair of flat resilient bars lying in planes intersecting each other substantially in the shaft center of the motor, means intermediate the ends of the bars for attaching them to the frame of the motor, a base having upstanding resilient lugs, and clamping means for attaching the ends of the bars to the lugs.

12. A motor support comprising a pair of flat resilient bars lying in planes intersecting each other substantially in the shaft center of the motor, means intermediate the ends of the bars for attaching them to the frame of the motor, a base having resilient upstanding lugs, clamping means for securing the ends of the bars to the lugs respectively, and rubber spool washers interposed between the bars and the lugs.

13. A motor support comprising a pair of flat resilient bars lying in planes intersecting each other substantially in the shaft center of the motor, means intermediate the ends of the bars for attaching them to the frame of the motor symetrically with reference to a central vertical plane passing axially through the motor, a base, and means for attaching the ends of the bars to the base.

14. A motor support comprising a pair of bars struck from resilient sheet metal with ears integral therewith intermediate the ends of the bars for attaching them to the frame of the motor, said bars being positioned, respectively, in planes substantially normal to each other and intersecting each other substantially in the shaft center of the motor, a base, and means for attaching the ends of the bars respectively to the base.

JAMES A. RODGERS.